Patented Dec. 2, 1952

2,620,350

UNITED STATES PATENT OFFICE 2,620,350

NITROGEN CONTAINING ORGANIC COMPOUNDS

Isaac Croom Beatty, III, La Fayette, Ind.

No Drawing. Application November 8, 1951,
Serial No. 255,531

5 Claims. (Cl. 260—472)

This invention relates to nitrogen containing compounds and more specifically refers to compounds containing two anesthesiophore groups.

The field of anesthetics and particularly local anesthetics has been the subject of much and intensive research during the last half century. Much of the work has been done following the discovery of procaine.

The literature is filled with compounds synthesized for anesthetic investigation, but very few compounds have actually been developed and found suitable for medical use.

It is an object of the present invention to produce new and useful organic compounds. An additional object is to produce compounds having two anesthesiophore groups, which compounds are useful as local anesthetics.

These objects are attained in accordance with the present invention wherein there is produced a compound conforming to the general formula

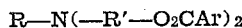

$$R—N(—R'—O_2CAr)_2$$

wherein R represents an aromatic nucleus; R' represents a bivalent alkyl radical containing at least two carbon atoms and Ar represents a phenyl nucleus which may be further substituted.

In a more restricted sense, the invention is concerned with derivatives in which R' represents a bivalent ethane group and the Ar group is an amino substituted phenyl nucleus. Most of the compounds herein described may be produced in the form of hydrochlorides or other salts suitable for use as anesthetics or other purposes.

The invention is best described with reference to the following examples.

EXAMPLE 1

*Preparation of the di-p-aminobenzoate of phenyl diethanolamine*

Phenyl di-ethanolamine in the amount of 27.2 g. (0.15 mole) was dissolved in 350 ml. of water to which 15 g. (0.38 mole) of sodium hydroxide had been added. The solution was put in a 500 ml. flask equipped with a funnel, mechanical stirrer, and a thermometer. 55.8 grams of finely divided p-nitrobenzoyl chloride (0.3 mole) was added at such a rate as to hold the temperature within the range of 35–40° C. The reaction was stirred until the temperature dropped below 35° C., which required approximately three hours. The granular, insoluble compound formed was filtered and washed with water until the wash water was neutral to hydrion paper. The compound was recrystallized from hot, absolute ethanol. The cream-colored crystals melted at 130–130.7° C. The yield was 87.0%. The molecular weight determined was 480.5. The nitrogen analysis showed 8.65% nitrogen.

The nitro compound was then reduced in a hydrogenator at 60° C. and under a pressure of 60 p. s. i., using platinum oxide as a catalyst and ethanol as the solvent. The solvent was removed under reduced pressure. The yield was quantitative. The melting point was 151.5–152.5° C., the molecular weight 419.4 g. and the nitrogen analysis showed 10.10% nitrogen.

The amino compound was then put into ether in the proportion of 2 g. per 1,000 ml. of ether. Dry hydrogen chloride gas was bubbled into this solution and white crystalline substance resulted. The yields were quantitative and from the weight of compound obtained, three molecules of hydrogen chloride reacted with one molecule of the amino compound. The melting point of the hydrochloride salt was 116.5° C.

EXAMPLE 2

*Preparation of the di m-aminobenzoate of phenyldiethanolamine*

In the manner described, 27.2 g. (0.15 mole) of phenyldiethanolamine were condensed with 55.6 g. (0.3 mole) of m-nitrobenzoyl chloride. The ester obtained had a melting point of 87.0–87.5° C., and was obtained in an 89.6% yield. The molecular weight was 478.0 and the nitrogen content was 8.80%.

The ester was reduced from the nitro derivative to the amino derivative in the manner described before. The yield was quantitative. The molecular weight was 419.4, the nitrogen content was 10.10%, and the boiling point of the oil obtained was 116.5° C.

The amino derivative was then dissolved in ether in the proportion of 2 g. of the amino derivative to 1,000 ml. of ether. Dry hydrogen chloride in ether was added and the resulting white crystals were separated by evaporating the solvent under reduced pressure. The yield was quantitative and indicated that three molecules of hydrogen chloride had reacted with one molecule of the amino compound. The melting point was 212.5° C. (*d*).

EXAMPLE 3

*Preparation of the di-benzoate of phenyldiethanolamine*

The condensation reaction was done in the manner described above using 27.18 g. (0.15 mole) of phenyldiethanolamine and 42.1 g. (0.3 mole) of benzoyl chloride. The ester obtained was a green semisolid and was obtained as an 83.7% yield. The molecular weight was 387.5, the melting point 43.5–44.0° C., and the nitrogen content 3.62%.

The ester was dissolved in ether, 5 grams of oil to 500 ml. of ether, and a solution of dry hydrogen chloride added until no more precipitate formed. The precipitate was a light green oil. The solvent was removed under reduced pressure. The yield was quantitative and indicated that one molecule of hydrogen chloride reacted with one molecule of the ester. The boiling point was 181.5° C. with decomposition taking place.

The above compounds described in the form of their hydrochloride salts were tested for their anesthetic properties by using the anesthetics on fish.

Water solutions in the ratio of one part by weight of salt in 4,000 parts by weight of water were used. Goldfish were put into each of the solutions of the amino hydrochloride salts. The time for the fish to become quiet and the time required for complete anesthesia were recorded. This gave an indication of the speed of absorption of the drug. The fish was then placed in fresh water and the time required for normal movement to return was recorded. This gave an indication of the depth of anesthesia. Table A, which follows, shows the times recorded as contrasted to the times recorded for novacaine used as a standard caine. The p-amino compound had the longest effect.

In addition to the anesthetic utility of the new compounds the latter may be employed as plasticizers for resins, dielectric materials, as intermediates for further chemical reaction, etc.

The preferred compound is the di-p-aminobenzoate of phenyl diethanolamine. It is to be understood that the R nucleus, phenyl or naphthyl, may be further substituted to modify the solubility and other properties. Other R' groups include isopropyl, n-propyl, butyl, etc.

As many widely different embodiments of this invention may be made without departing from the spirit and scope thereof, it is to be understood that the invention is not limited to the specific embodiments herein described except as defined in the appended claims.

What is claimed is:

1. A compound conforming to the general formula

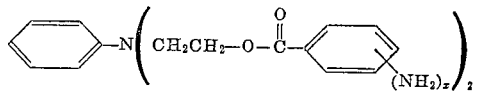

wherein $x$ is an integer from 0 to 1.

2. A local anesthetic comprising a hydrochloride salt of a compound of claim 1.

3. The di-p-aminobenzoate of phenyl diethanolamine.

4. The di-benzoate of phenyl diethanolamine.

5. The di-m-amino benzoate of phenyl diethanolamine.

TABLE A

*Physical properties of the hydrochloride salts*

| Salt[1] | State of Sol.[2] | Anesthetic Effect | | |
|---|---|---|---|---|
| | | Time to Become Quiet | Time for Complete Anesthesia | Time to Revive |
| 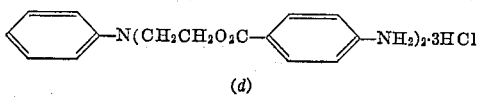 —N(CH₂CH₂O₂C— —NH₂)₂·3HCl  (d) | Cloudy (S-S) | 10 min. 15 sec. | 12 min. 5 sec. | 46 min. 55 sec. |
| 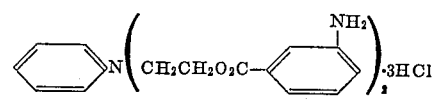 (d) | Cloudy (S) | 5 min. 55 sec. | Not complete in 70 min. | 1 min. 30 sec. |
| Standard Novocaine | Clear | 2 min. | 47 min. | 13 min. |
| H₂N— —CO₂CH₂CH₂N(C₂H₅)₂ | (V-S) | | 50 sec. | |

[1] (d)—deliquescent.
[2] V-S—very soluble; S—soluble; S-S—slightly soluble.

It will be noted from the above table that all the compounds disclosed exhibit anesthetic properties which favorably compare to novo-

ISAAC CROOM BEATTY, III.

No references cited.